United States Patent

[11] 3,615,979

| [72] | Inventors | Carlton J. Davis, Sr.<br>Newark;<br>Richard P. Wood, Granville; Everett R. Miller, Granville, all of Ohio |
|---|---|---|
| [21] | Appl. No. | 741,677 |
| [22] | Filed | July 1, 1968 |
| [45] | Patented | Oct. 26, 1971 |
| [73] | Assignee | Owens-Corning Fiberglas Corporation |

[54] PROCESS OF MAKING SHEET MOLDING COMPOUND AND MATERIALS THEREOF
15 Claims, 2 Drawing Figs.

[52] U.S. Cl....................................................... 156/87,
156/179
[51] Int. Cl......................................................... B32b 31/00
[50] Field of Search........................................... 260/862;
161/112, 193, 194, 195, 203; 156/252, 253, 332, 87, 179, 137; 264/112, 113, 154, 155, 156; 117/72, 124 GR

[56] References Cited
UNITED STATES PATENTS

| 2,545,243 | 3/1951 | Rumsey, Jr. ................. | 156/87 X |
| 2,732,885 | 1/1956 | Van Der Hoven............. | 156/179 X |
| 2,841,515 | 7/1958 | Runton.......................... | 156/179 X |
| 3,037,895 | 6/1962 | Quinn............................ | 156/179 X |
| 3,475,264 | 8/1969 | Donaldson .................... | 156/179 X |

*Primary Examiner*—Carl D. Quarforth
*Assistant Examiner*—S. R. Hellman
*Attorneys*—Staelin & Overman and William P. Hickey ABSTRACT: The specification describes a process for making a sheet molding compound wherein a layer of resin-filler paste that includes a thickening agent and a hardening catalyst is put down upon a first layer of sheet material; a layer of glass fibers that are sized with a material which induces wet out is placed thereon; following which another layer of the resin-filler paste containing the catalyst is placed thereon and covered by a second layer of sheet material. The sandwich thus formed is fed into the bite of rollers which squeeze out air and compress the resin-filler paste around the sized fibers, following which the composite is placed under further compaction that includes a perforating means which forces needlelike members through at least one layer of the sheet material, through the resin-filled paste, and into the layer of fibers for the removal of remaining entrapped air. The glass fibers which are used are sized with a material that includes both a hardening resin, and a nonhardening resin. Specifically, the fibers are coated with an unsaturated polyester resin and a saturated polyester resin which are preferably deposited on the glass fibers as emulsified particles.

PATENTED OCT 26 1971

3,615,979

INVENTORS
CARLTON J. DAVIS, SR.,
RICHARD P. WOOD &
BY EVERETT R. MILLER

Staelin & Overman
ATTORNEYS

3,615,979

PROCESS OF MAKING SHEET MOLDING COMPOUND AND MATERIALS THEREOF

BACKGROUND OF THE INVENTION

The present invention relates to an improved process for inexpensively producing molded plastic products which are reinforced by glass fibers. Many processes have been developed for producing molded plastic products that are reinforced by glass fibers. In one type of hand lay-up operation, the surface of a mold is coated with a resin, as for example a polyester resin, and glass fibers in the form of a mat or woven fabric is applied thereto and the fibers are wetted out by additional resin. The process is repeated until the desired thicknesses of composite are obtained. Thereafter, the resin is cured and the finished article is stripped from the mold.

In another type of hand lay-up operation, resin is sprayed upon the surface of the mold by what is called a hand lay-up gun, which gun also blows chopped glass fibers into the resin spray that is caused to impinge upon the surface of the mold. This gun spraying operation is continued until the desired thickness of composite is obtained, following which the composite is cured and stripped from the mold.

In another type of hand lay-up operation, the molding surfaces of matched dies are coated with resin and glass fibers in the form of a mat, etc. are placed in the mold cavity, and the matched dies are brought together to compress the resin and fibers into the desired shape.

In a somewhat more automated process, chopped glass fibers and a resin molding compound are mixed together in a mixer, and then extruded through an orifice for the purpose of compacting the resin and fibers together. The extruded product is usually chopped into what are called pellets, and these pellets are then fed either into a transfer or an injection mold where they are forced into a die cavity having the desired shape. This procedure involves the use of expensive equipment, and a number of operations which make the total process quite costly.

Because all of the above processes are quite costly, the art has desired to produce sheets of molding compound which have the reinforcing glass fibers distributed throughout, which sheets of molding compound can thereafter be fed into dies which stamp the sheet material into the finished desired shape. In one method of producing sheet molding compound containing glass fibers, the materials are mixed together and then extruded into sheets.

In another type of operation which has been tried, the glass fibers are deposited into a layer of the desired thickness, powdered resin is applied thereto, and this resin is heat softened and forced around the fibers to produce the composite.

In another type of operation, the molding compound is sprayed upon glass fibers which are then formed into a layer of composite sheet material. All of these processes of producing sheet molding compound are expensive to carry out, either because they require a lot of hand work or inspection, or because they require very expensive equipment.

An object of the present invention, therefore, is the provision of a new and improved method of producing glass fiber reinforced molded products which can be carried out by high-production equipment with a minimum of hand labor and inspection, and which, therefore, is less costly than prior art processes.

Another object of the present invention is the provision of new and improved coated glass fibers which are wet out by plastic molding compounds much more easily and with greater rapidity than prior art glass fibers.

A still further object of the invention is the provision of a new and improved glass fiber reinforced molding compound that contains a curing catalyst and in which the molding compound is separated from the fibers by a fiber coating of uncatalyzed particles of a curing resin having carbon to carbon double bonds and uncatalyzed particles of a noncuring resin.

SUMMARY OF THE INVENTION

The present invention can be carried out in a continuous manner by applying a layer of a resin-filler mixture or paste that contains a curing catalyst onto the surface of sheet material, as for example a polyethylene film. Glass fibers which have previously been treated, as will later be explained, are laid on top of the layer of resin-filler paste, and another layer of resin-filler past containing the catalyst is deposited over the glass fibers. Thereafter, a second layer of sheet material, as for example a polyethylene film is positioned against the second applied layer of resin-filler paste, and the composite sandwich is compressed together preferably by means of a pair of rolls. The rolling action forces the resin-filler paste through the layer of fibers in a manner squeezing out most of the air entrained by the fibers. Thereafter a plurality of needlelike members are forced through at least one layer of the sheet material downwardly through the resin-filler paste into the layer of fibers to form openings for the removal of entrapped air. Further compaction of the composite squeezes out the entrapped air and causes the resin-filler paste to fill in the openings formed the needlelike the needlelike members.

The above described process is made operable by the use of glass fibers which have been previously coated with a mixture of a curing resin containing unsaturated carbon to carbon double bonds and a compatible noncuring resin, specifically a saturated polyester resin in a ratio of from approximately 10 percent to approximately 14 percent. The coated glass fibers should be devoid of a curing agent, and the coating material is preferably deposited as particles of a water emulsion stabilized by an emulsifying agent.

Also in the preferred embodiments, an alkaline earth metal oxide and/or hydroxide and a curing agent are incorporated into the mixture forming the resin-filler paste. The alkaline earth metal oxide produces a gelling action of the resin-filler paste without the application of heat. The polyethylene sheets allow the composite sandwich to be handled or coiled into a roll without sticking together. This sandwich later hardens into a pliable nontacky state upon aging. The layers of polyethylene can be removed from the aged glass fiber containing sheet of molding compound, and the sheet of molding compound can thereafter be physically handled in conventional molding operations using heat and pressure to form the finished molded article.

EXAMPLE 1

Figure 1:
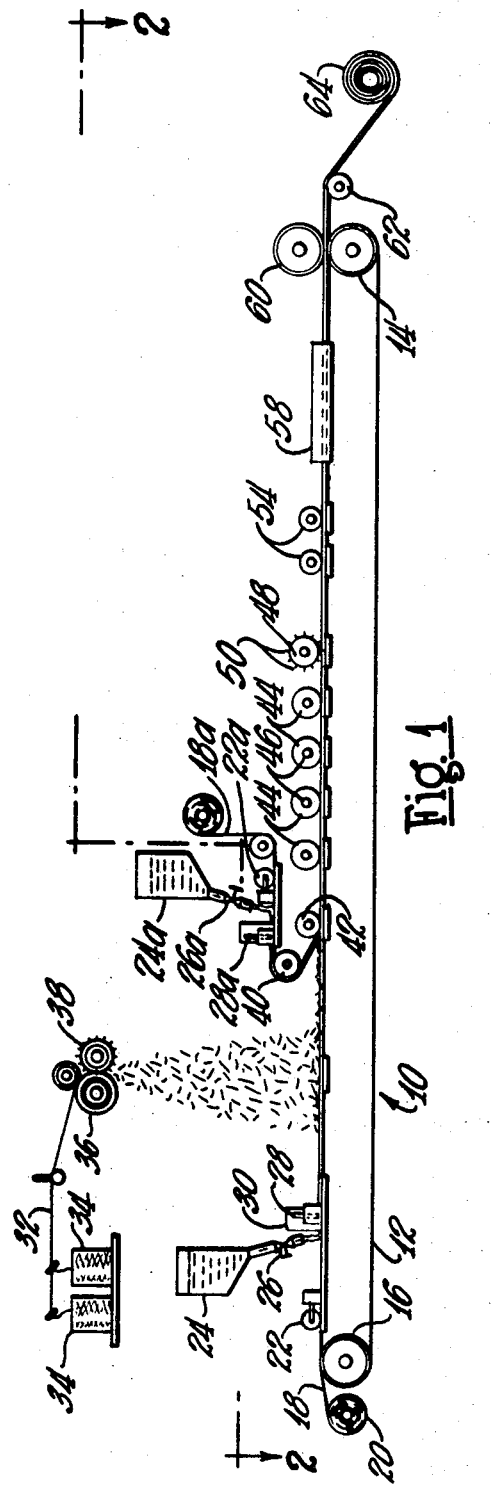
FIG. 1 of the drawings is a schematic side view of apparatus for making the sheet molding composite of the present invention.

A coating material suitable for coating glass fibers is made as follows:

| Material | Desirable % by Wt. | Preferred % by Wt. |
|---|---|---|
| Unsaturated Polyester Resin 1 mol phthalic anhydride, 1 mol maleic anhydride, 2 mols propylene glycol cooked to an acid number of 30-35 | 5-15 | 8.4 |
| Solvent | optional | 3.6 |
| Emulsifying Agent | 0.8-4.5 | |
| *Pluronic F77 | | 1.09 |
| Coupling Agent | 0.3-3 | |
| Gamma methacryloxypropyltrimethoxysilane | | 0.500 |
| Acid for pH Control | 0.01-4.0 | |
| Glacial acetic acid | | 0.04 |
| Cationic Lubricant | 0.10-5 | |
| **AHCO 185 AE | | 0.126 |
| AHCO 185 AN | | 0.054 |
| Saturated Polyester Resin | 0.34-1.5 | |

| | | |
|---|---|---|
| 1 mol phthalic anhydride, 1 mol succinic anhydride, 2.3 mols propylene glycol cooked to an acid number of 35-40 | | 0.70 |
| Water | | Balance |

One-tenth of the emulsifying agent is added to the saturated polyester resin and thoroughly mixed therewith, and the remainder of the emulsifying agent is added to a separate container holding the unsaturated polyester resin and is thoroughly mixed therewith. Thereafter, one tenth of the water is placed in a container that is agitated by an Eppenbach mixer, and the saturated polyester resin is slowly added thereto. The balance of * Pluronic F77 is a trade name of Wyandotte Chemical Corp. for a condensate of ethylene oxide with a hydrophobic base formed by condensing propylene oxide with propylene glycol. **AHCO 185 AE is a trade name of Arnold Hoffman Co. for the reaction product of tetraethylene pentamine and pelargonic acid and solubilized with acetic acid. AHCO 185 AN is a trade name of Arnold Hoffman Co. for the reaction product of tetraethylene pentamine and caprylic acid solubilized with acetic acid. The water is placed in another container that is agitated by an Eppenbach mixer and the unsaturated resin mix is slowly added thereto. The glacial acetic acid is added to the coupling agent and thoroughly mixed therewith, and the hydrolyzed coupling agent thus formed is then added to the emulsion of the unsaturated resin. The emulsion of the saturated resin is then added to the emulsion of the unsaturated resin with mixing, and the cationic lubricants are added and thoroughly dissolved therein.

Four hundred twenty molten streams of glass are attenuated to a diameter less than 0.0005 inch and preferably approximately 0.00035 inch and are immediately pulled over a roll-type applicator that is coated with the above described coating material. The fibers, thereafter, are brought together into a strand and wound upon a winding drum to from a coiled package, following which the coiled package is dried of the water.

A resin-filler paste is made of the following materials:

| Materials | Desirable % by Wt. | Preferred % by Wt. |
|---|---|---|
| Resin Having Crosslinkable Olefinic Double Bonds | 25-95 | |
| Unsaturated resin used above | | 42.7 |
| Catalyst for Cross-linking Double Bonds | 0.1-5 | |
| Dicumyl peroxide | | 0.85 |
| 2,5-dimethyl hexyl-2,5-di (peroxybenzoate) | | 0.09 |
| Mold Release Agent | 0-5 | |
| Zinc Stearate | | 1.71 |
| Gelling Agent (Alkaline Earth Metal Oxide) | 0.2-10 | |
| Ca(OH)$_2$ | | 1.28 |
| Solvent | optional | |
| Styrene monomer | | 4.27 |
| Fillers | 0-75 | |
| Resin type (microethylene) | | 6.4 |
| Nonresinous filler (CaCO$_3$) | | 43.7 |

The resin-filler paste is prepared by charging the resin to a Cowles type mixture. The 2,5-dimethyl hexyl-2,5-di (peroxybenzoate) dissolved in approximately half of the styrene is blended with the resin. Thereafter, the dicumyl peroxide and mold release agent are added. The resin type filler is then blended in, following which the nonresinous filler is likewise added and thoroughly dispersed. Immediately before the resin-filler paste is to be used in making the sheet molding compound, a slurry of the gelling agent in the other half of the styrene is added and mixed for approximately three minutes.

Figure 2:
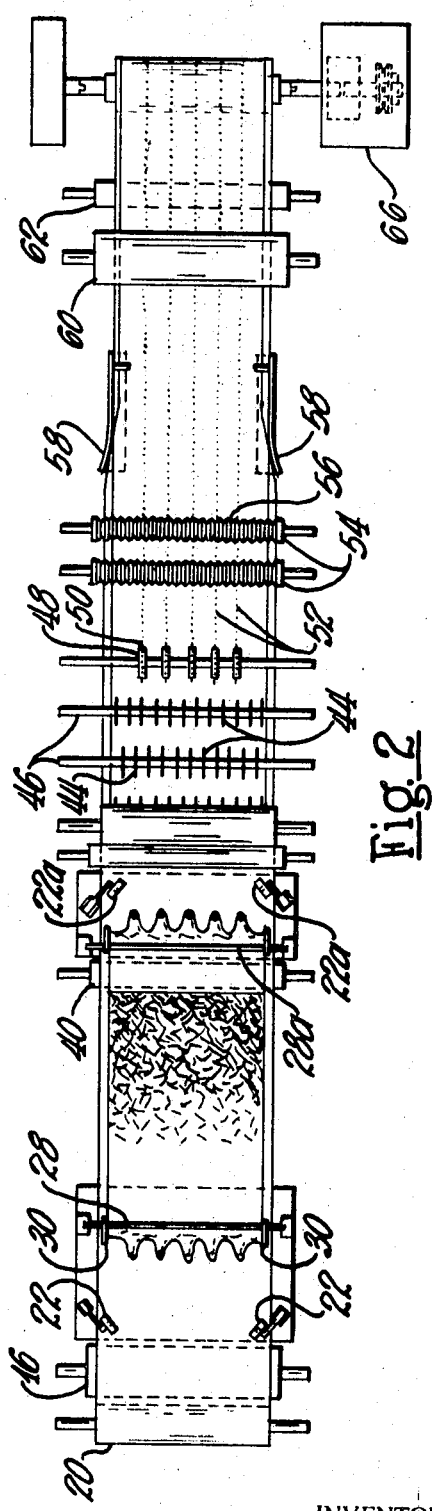
FIG. 2 is a plan view taken approximately on the line 2-2 of FIG. 1.

FIGS. 1 and 2 of the drawing depict a preferred process for forming the materials above described into the sheet molding compound. The apparatus shown in FIGS. 1 and 2 has an endless belt conveyor 10, the belt 12 of which extends around head and tail pulleys 14 and 16 respectively. Sheet material 18, as for example a polyethylene sheet, is uncoiled from a roll 20 and is advanced by the top run of the conveyor 10 through numerous operations. After coming into contact with the belt 12, the film is contacted by a pair of sheet smoothing rolls 22, respective ones of which are positioned adjacent respective sides of the sheet. The smoothing rolls pull the opposite side edges apart and take out wrinkles. Thereafter, the molding compound is flooded onto the sheet from a reservoir 24 through a plurality of nozzles 26, following which the resin is contacted by a doctor blade 28 which smoothens the resin to a thickness of approximately one-sixteenth in. The doctor blade 28 includes edge guides 30 which prevent the resin from coating one inch edge portions of the sheet.

Strands 32 from packages 34 of glass fibers coated as above described are pulled over a rubber roll 36 that is engaged by another roll 38 having projecting bars or blades which force the strands 32 into the rubber surfacing to break the strand into lengths of approximately 2 inches. The chopped fibers fall upon the resin layer to provide a layer of fibers approximately ½-inch thick. Another strip of sheet material 18a, in the present case polyethylene, is uncoiled from a roll and advanced towards the area of fiber deposition from the direction opposite to that of the conveyor movement. The sheet 18a is coated with a layer of molding resin in the same manner previously described for the sheet 20. The parts of the coating apparatus for the sheet 18a which corresponds to similar parts of the coating apparatus for the sheet 18 are designated by a like reference numeral characterized further in that a suffix "a" is affixed thereto. The polyethylene sheet 18a with a resin coating of approximately one-sixteenth inch thereon, passes around an idler roll 40 which changes the direction of movement of the sheet 18a to correspond with that of the sheet 18. The film 18a with the resin now on its bottom surface is forced down on top of the chopped fibers by a squeeze roll 42. The sandwich formed by the two sheets of polyethylene having the resin and chopped fibers therebetween is then passed beneath a plurality of disks 44 which roll along the top polyethylene sheet 18a to work the resin into the fibers. In the embodiment shown in FIGS. 1 and 2, the disks are arranged in four rows with the disks of respective rows being staggered so that substantially all portions of the resin are kneaded into the fibers. The disks of each row are concentrically supported on shaft 46 suitably journaled for rotation. The composite sandwich, thereafter, passes beneath a roll 48 having needle shaped projections 50 thereon which are forced through the sheet 18a and through the resin into the layer of fibers. The holes 52 made by the projections 50 allow air that is trapped in the fibers to escape, and thereafter, the sandwich is passed beneath a pair of rolls 54 having evenly spaced ridges thereon, which further knead the resin into the fibers. The uncoated edge portions of the sheets 18 and 18a are turned over by a pair of folding shoes 58, and the sandwich thereafter is advanced between a pressure roller 60 positioned above the head pulley 14 which assures that the resin is displaced into the openings made by the needlelike projections 50. Thereafter the sandwich passes over an idler roll 62 and is wound into a coiled package 64 by conventional power driven equipment 66, which provides a controlled tension of between three-fourths and 1 pounds per lineal inch of sandwich for densification and wet out.

The sandwich thus made is stored for 2 to 7 days at room temperature, during which time the alkaline earth oxide reacts with acid anhydride radicals of the resin to gel the resin and convert it into a handleable sheet. This sheet is prepared for molding by cutting sections from the roll 64, which sections contain the desired amount of material. The polyethylene sheets are stripped therefrom and the molding compound is placed into the cavity of matched dies. The matched dies are brought together to cause the molding compound to be displaced throughout the cavity, and the compound is cured in the cavity at a temperature of approximately 300° F. for 1 to 2 minutes. A completely acceptable glass fiber reinforced molded article is thus produced in which the molding compound is firmly bonded to the glass fibers.

EXAMPLE 2

Two thousand forty molten streams of glass are attenuated into fibers of 0.00015 inch and are pulled over a roll-type applicator to which a water solution containing 0.50 percent of gamma methacryloxypropyltrimethoxysilane hydrolyzed by acetic acid is supplied. These fibers are coiled into a package and dried to a water content of approximately 5 percent, following which they are uncoiled and pulled through a bath of the coating materials given in example 1, excepting that the materials are devoid of the coupling agent and are mixed by a different procedure. These fibers are then wound into a coiled package and dried. The fibers thus prepared are used to make sheet molding compound using the procedure of example 1 to produce a satisfactory fiber reinforced molded product in which the fibers are completely surrounded and bonded to the molding compound.

The coating material that is applied to the glass fibers dries to form beads of unsaturated resin having a coating of emulsifying agent thereon, and containing sufficient saturated resin to prevent film forming on standing. It is now believed that the olefinic or unsaturated bonds of a crosslinkable resin take on oxygen upon standing to form a skin which interferes with wet out, unless the unsaturated resin molecules are separated by noncuring molecules, and specifically the saturated materials of the present invention. According to the present invention, the saturated resin particles keep molecules of the unsaturated resin in spaced relationship, during the time that the fibers are coated with the molding compound, and prior to the time that this material is cured in a mold at elevated temperature. After being surrounded by the molding compound during the sheet forming operation, the alkaline earth metal oxide cross-links the anhydride or acid radicals of the resin. It will be noted that no curing catalyst is included in the material that coats the fibers. The unsaturated resin particles on the fibers, therefore, are prevented from hardening to any extent until the molding operation, even though the composite sandwich is stored for prolonged periods of time during which a slight hardening of the resin-filler paste may be experienced. When heated in the mold, however, under pressure, the saturated resin particles become fluid and mix with the resin of the resin-filler paste to allow the resin of the resin-filler paste to migrate to the surface of the glass. The coupling agent used in the fiber coating has already migrated to the glass during the drying process of the coating material on the fibers, and so a bond is produced between the coupling agent and the resin of the resin-filler paste. Since the coating on the fibers already contains a large percentage of unsaturated resin, a bond is established to the coupling agent which is not appreciably diluted by the saturated resin initially present as part of the coating.

The process above described can be used for making glass fiber reinforced molding compounds which contain any resin which can be similarly thickened or gelled by a reaction which increases the chain length at a low temperature, and which can be subsequently cross-linked into a rigid condition in a heated mold at a high temperature. The increase in chain length can be linked to that which takes place during the B-staging of a phenolic resin. A suitable molding compound, therefore, can be made by partially reacting phenol with a deficiency of formaldehyde to provide a thick syrupy resole. The thick syrup can be used in place of the resin in the resin-filler paste above described. The resin-filler paste will also include an acid catalyst which will produce thickening on standing and hexamethylenetetramine which will later cross-link the resin when heated to elevated temperatures in a mold.

Another example of a resin-filler paste which can be made is one using a polyester having OH terminal groups, and a diisocyanate, for example 2 –4 toluene diisocyanate, as a gelling agent. The polyester resin must be an unsaturated one, and the resin-filler paste will include a free radical catalyst, as for example those given in example 1, to cross-link the polyurethane at elevated temperatures during molding. One suitable polyester backbone material is made by reacting 1 mol of phthalic anhydride, 1 mol of maleic anhydride, and 2.3 mols of propylene glycol to an acid number of 35. The diisocyanate in an amount comprising approximately one-tenth by weight of the resin can be used as a gelling agent, and the mol release, cross-linking catalyst, and solvent may be used in the same percentages given in example 1. Because a larger amount of diisocyanate is used as a gelling agent than the alkaline earth metal oxide of example 1, the percentage of filler in the polyurethane forming paste may be correspondingly decreased.

The mold release agent used in the resin-filler paste may not be necessary in all instances, but is highly desirable in order to prevent sticking to the shaping mold. The process would be operable without fillers in the molding compound, but the fillers are desired in commercial materials in order to reduce the cost of the product and improve the properties for many applications. Other suitable examples of nonresinous fillers are calcium carbonate, alumina, and *WEF

*WEF is a trade name of the Weyerhauser Corp. for a wood filler made from ground up Douglas fir bark fibers. wood-type fillers. fillers. Still others will occur to those skilled in the art. The resin type filler is not necessary in all instances, but is used to provide better surface smoothness, reduce shrinkage, increase resilience, etc. Other examples of resin type fillers are powdered acrylic polymers, powdered polyvinyl chloride polymers, powdered polypropylene polymers, etc.

Any alkaline earth metal oxide can be used as a gelling agent for resins having carboxyl groups. Magnesium oxide and calcium hydroxide are particularly useful materials, and barium oxide also can be used.

Any hydrolyzable organo silane having a functional group which will react with the resin can be used as a coupling agent. Suitable examples are those given in the Santelli U.S. Pat. No. 3,075,948.

As previously described, the first stage of reaction which the resin undergoes at room temperature transforms the resin-filler paste into a material which can be handled. This reaction produces an increase in the linear chain length of the resin such that the resulting material is plastic, and not rigid. This thickening is sometimes called gelling of the resin, and is analogous to the B-stage of polymerization which a phenol formaldehyde resin undergoes to produce a thermoplastic resin that is soluble in organic solvents. B-stage, or B-staging, is used in this specification to describe a similar type of linear polymerization, or thickening, regardless of the type of resin used.

In phenol formaldehyde systems, the transition of a B-staged material to a cross-linked nonfusable, and generally inert stage is called C-staging and results in a C-staged material. C-stage, or C-staging, is used in this specification to indicate a similar cross-linking of the B-staged resin into a thermoset condition regardless of the type of resin system or mechanism by which the resin is cross-linked While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. A method of producing moldable glass fiber reinforced resin strip material comprising: coating glass fibers with a material consisting essentially of:

| Material | Percent by Weight |
|---|---|
| Unsaturated polyester resin | 4–12 |
| Organosilane coupling agent | 0.1–1 |
| Emulsifying agent | 0.3–2 |
| Cationic lubricant | 0.05–0.50 |
| Saturated polyester resin | 0.4–1.5 |
| Acid pH control | |
| Water | | applying a layer of a resin-filler paste consisting essentially of the following materials onto a sheet material:

| Material | Percent by Weight |
| --- | --- |
| Unsaturated polyester resin | 20–40 |
| Cross-linking catalyst | 0.001–1.0 |
| Mold release agent | 0.5–10 |
| Filler | 20–70 |
| Styrene | 2–20 |
| Alkaline earth metal oxide | 0.5–5.0 | applying a layer of the coated glass fibers above described onto the layer of resin-filler paste, applying additional resin-filler paste over the layer of fibers, placing another layer of sheet material over the layer of additional resin-filler paste, compressing the composite thus formed together puncturing at least one layer of sheet material and subjecting the composite to pressure to remove trapped air, and reacting the resin with the alkaline earth metal oxide.

2. The method of claim 1 wherein molten streams of glass are attenuated to a diameter less than approximately 0.0005, and the glass fibers are immediately coated and protected with an emulsion consisting essentially of the unsaturated polyester resin, organic coupling agent, and saturated polyester resin of claim 1.

3. The method of claim 2 wherein the fibers are chopped into less than approximately 2 inch lengths which are then applied in a layer over the top of the first described layer of molding compound.

4. The method of claim 1 followed by the steps of: stripping the sheet material from the composite, and molding the composite under heat and pressure to react the unsaturated bonds and cross-link the resin.

5. The method of claim 1 wherein the coating material for the fibers comprises the following approximate weight percentages: 8.4 unsaturated polyester resin, 0.5 gamma methacryloxypropyltrimethoxy silane, and 0.7 saturated polyester resin.

6. The method of claim 1 wherein the saturated polyester resin is formed by reacting approximately 1 mol phthalic anhydride, 1 mol of succinic anhydride, and 2.3 mols of propylene glycol to an acid number of 30–35.

7. The method of claim 1 wherein the molding compound comprises the following materials in approximate percentages by weight: 42.7 unsaturated resin, 0.85 dicumyl peroxide, 0.09 2,5-dimethyl hexyl-2,5-di (peroxybenzoate), 1.7 zinc stearate, 6.4 polyethylene homopolymer, 43.7 CaCo$_3$ filler, 4.27 styrene, and 1.28 hydrated CaO.

8. The method of claim 1 wherein the resin-filler paste consists essentially of an unsaturated polyester resin made by reacting approximately 1 mol of phthalic anhydride, approximately 1 mol of maleic anhydride, and approximately 2 mols of propylene glycol to an acid number of 30 to 35 and the filler is a mixture of CaCO$_3$ and polyethylene homopolymer.

9. The method of claim 1 wherein the sheet materials are polyethylene films.

10. The method of claim 9 wherein the composite is passed beneath a roller that is provided with sharp projections which puncture the polyethylene film.

11. A method of producing moldable glass fiber reinforced resin strip material comprising: coating glass fibers with a resin forming material which contains a glass coupling agent and is capable of mixing with a later applied resin containing material, said resin having molecules with a first type of functionality at the ends thereof for producing thermoplastic linear chains and a second type of functionality intermediate the ends for cross-linking the molecules, applying lengths of the coating glass fibers above described onto the layer of resin containing paste, applying additional resin containing paste over the layer of fibers, placing another layer of sheet material over the layer of additional resin containing paste compressing the composite thus formed together, puncturing at least one layer of sheet material at closely spaced intervals generally coterminous with said layer of fibers and subjecting the composite to pressure to remove entrapped air, and linking ends of the resin molecules together by the first type of functionality to thicken the resin into a thermoplastic condition without appreciably cross-linking the molecules.

12. The process of claim 11 wherein the solids of the coating on the glass fibers comprises more than approximately 5 percent of a saturated resin and is devoid of a catalyst which produces cross-linking of the resin.

13. The method of producing glass fiber reinforced molding compound comprising: applying a polymerizable resin containing paste onto a sheet material, said polymerizable resin having molecules with a first type of functionality at the ends thereof for producing thermoplastic linear chains and a second type of functionality intermediate the ends for cross-linking the molecules, applying lengths of glass fibers onto the layer of paste, applying additional polymerizable resin containing paste over the layer of fibers, placing another layer of sheet material over the layer of additional paste, compressing the composite thus formed together, puncturing at least one layer of sheet material at closely spaced intervals generally coterminous with said layer of fibers by projections which penetrate into the layer of fibers, subjecting the composite to a kneading action to remove entrapped air out of the punctures, and linking the ends of the resin molecules together by the first type of functionality to thicken the resin to a thermoplastic condition without appreciably cross-linking the molecules.

14. The method of claim 13 wherein the stop of subjecting the composite to pressure to remove entrapped air involves the kneading of the molding compound laterally of the sheet to displace air through the punctured sheet material.

15. The method of claim 14 wherein the kneading step is performed by a series of rolls having spaced apart annular ridges and valleys.

* * * * *